United States Patent [19]

Hill et al.

[11] Patent Number: 5,262,088
[45] Date of Patent: Nov. 16, 1993

[54] EMULSION GELLED SILICONE ANTIFOAMS

[75] Inventors: Randal M. Hill; Michael S. Starch; Margaretmary S. Gaul, all of Midland, Mich.

[73] Assignee: Dow Corning Corporation, Midland, Mich.

[21] Appl. No.: 645,540

[22] Filed: Jan. 24, 1991

[51] Int. Cl.⁵ .............................. B01D 19/04
[52] U.S. Cl. ........................ 252/321; 252/358; 252/174.15
[58] Field of Search ............. 252/321, 358, 174.15

[56] References Cited

U.S. PATENT DOCUMENTS

| | | | |
|---|---|---|---|
| 3,235,509 | 2/1966 | Nitzsche et al. | 252/358 |
| 3,304,266 | 2/1967 | Sullivan | 252/358 |
| 3,383,327 | 5/1968 | Sullivan | 252/358 |
| 3,388,073 | 6/1968 | Domba | 252/321 |
| 3,784,479 | 1/1974 | Keil | 252/358 |
| 3,984,347 | 10/1976 | Keil | 252/321 |
| 4,076,648 | 2/1978 | Rosen | 252/358 |
| 4,395,352 | 7/1982 | Kulkarni et al. | 252/321 |
| 4,460,493 | 7/1984 | Lomas | 252/321 |
| 4,465,849 | 8/1984 | Terae et al. | 556/450 |
| 4,618,642 | 10/1986 | Schoenherr | 524/425 |
| 4,639,489 | 1/1987 | Aizawa et al. | 524/588 |
| 4,690,715 | 9/1987 | Terae et al. | 252/358 X |
| 4,749,740 | 6/1988 | Aizawa et al. | 524/588 |
| 4,762,640 | 8/1988 | Schiefer | 252/321 |
| 4,935,464 | 6/1990 | Ona et al. | 524/837 |
| 4,954,565 | 9/1990 | Liles | 524/860 |
| 4,978,471 | 12/1990 | Starch | 252/174.15 |
| 4,983,316 | 1/1991 | Starch | 252/174.15 |
| 5,055,229 | 10/1991 | Pelton | 252/321 |

FOREIGN PATENT DOCUMENTS

| | | |
|---|---|---|
| 3405989 | 11/1989 | Australia . |
| 0273448 | 7/1988 | European Pat. Off. . |
| 1444314 | 4/1969 | Fed. Rep. of Germany . |

Primary Examiner—Robert L. Stoll
Assistant Examiner—Daniel S. Metzmaier
Attorney, Agent, or Firm—Alexander Weitz

[57] ABSTRACT

There is disclosed a method for foam control wherein the antifoam agent is an emulsion gelled silicon composition prepared by first dispersing a curable liquid organopolysiloxane composition in a liquid continuous phase to form an emulsion and then curing the liquid silicone organopolysiloxane in-situ to a gelled state. Preferred compositions of the present invention find particular utility in the control of foam in aqueous detergent systems.

36 Claims, No Drawings

EMULSION GELLED SILICONE ANTIFOAMS

FIELD OF THE INVENTION

The present invention relates to a method for foam control. More particularly, the invention relates to the above method wherein a curable liquid organopolysiloxane composition is dispersed in a liquid continuous phase to form an emulsion and the liquid silicone is then cured in-situ to a gelled state to form an emulsion gelled antifoam.

BACKGROUND OF THE INVENTION

The use of various silicone containing compositions to control foaming (i.e., as antifoams or defoamers) is known. In this regard, it is well established that this art is highly unpredictable and slight modification can greatly alter perforance of such compositions. Most of these compositions contain silicone fluid (usually dimethylpolysiloxane), often in combination with small amounts of silica filler. Additionally, these compositions may include various surfactants and dispersing agents in order to impart improved foam control or stability properties to the compositions. Thus, for example, Rosen, in U. S. Pat. No. 4,076,648, teaches self-dispersible antifoam compositions consisting essentially of a lipophilic nonionic surface active agent homogeneously dispersed in a non-emulsified diorganopolysiloxane antifoam agent. This combination is said to promote dispersibility in water without the need for emulsification.

Kulkarni et al., in U.S. Pat. No. 4,395,352, improved upon the compositions disclosed by Rosen, cited supra, by limiting the viscosity of the dimethylpolysiloxane oil therein to the range of 5,000 to 30,000 cS at 25 C. Such a limitation, it is taught, unexpectedly resulted in improved efficiency in difficult-to-defoam aqueous systems, such as those which contain high concentrations of ionic surfactants and those which are very viscous.

Keil, in U.S. Pat. No. 3,784,479, discloses foam control compositions which consist essentially of a base oil selected from polyoxypropylene polymers, polyoxypropylene-polyoxyethylene copolymers or siloxane-glycol copolymers, a foam control agent, comprising a liquid dimethylpolysiloxane and silica filler, and a dispersing agent which consists of a copolymer of a siloxane resin and a polyoxyalkylene polymer. The contribution to the art in this case is stated to be improved compatibility with otherwise desirable diluents without resorting to emulsifying the foam control agent in water.

In a closely related patent, U.S. Pat. No. 3,984,347, Keil discloses foam control compositions which consist essentially of a base oil selected from polyoxypropylene polymers, polyoxypropylene-polyoxyethylene copolymers or siloxane-glycol copolymers, a foam control agent comprising a liquid dimethylpolysiloxane and silica filler and a siloxane copolymer dispersing agent. This time the dispersing agent consists of a copolymer of a dimethylpolysiloxane polymer and a polyoxyalkylene polymer. The same advantages as reported for U.S. Pat. No. 3,784,479, cited supra, were obtained.

A process for control of foaming in non-aqueous systems is disclosed by Lomas in U.S. Pat. No. 4,460,493. The compositions employed consist essentially of (1) at least one foam control agent, selected from polydimethylsiloxane or poly(methyl-3,3,3-trifluoropropyl)siloxane, which may optionally include a minor portion of a siloxane resin, (2) a dispersing agent of the type described in the patents to Keil, cited supra, and (3) a non-ionic surfactant having an HLB number greater than 10. This invention is said to provide an effective and cost efficient foam control method for the non-aqueous systems described. A similar composition containing a high molecular weight polydimethylsiloxane was also shown to be useful in defoaming highly acidic aqueous systems by Schiefer in U.S. Pat. No. 4,762,640.

German Patent No. 1,444,314, to Farbwerke Hoechst AG, discloses wetting agents based on phosphoric acid esters of aliphatic alcohols which further contain methylpolysiloxanes as antifoaming agents.

European Patent Application 273,448 to Union Carbide Corp., published Jul. 6, 1988, teaches a foam suppressant composition made by a free-radical polymerization of a mixture of diorganopolysiloxanes, silica and a free-radical initiator, wherein the reaction product is diluted with a low viscosity polysiloxane.

More recently, Aizawa et al., in U.S. Pat. Nos. 4,639,489 and 4,749,740, the disclosures of which are hereby incorporated by reference, teach a method for producing a silicone defoamer composition wherein a complex mixture of polyorganosiloxanes, filler, a resinous siloxane and a catalyst to promote reaction of the other components is heated at 50° C. to 300° C.

McGee et al., in Australian Application for Patent No. 34059/89, published Nov. 9, 1989, combine the above mentioned compositions of Aizawa et al. with particular silicone glycol compounds to provide improved antifoams for use in high pH aqueous systems, particularly pulp mill liquors.

Starch, in U.S. Pat. No. 4,983,316, discloses silicone antifoam emulsions particularly suited for controlling foaming in aqueous detergent systems. In this patent, the above mentioned compositions of Aizawa et al. are used in conjunction with a secondary silicone antifoam agent and dispersed in a polypropylene glycol continuous phase.

Terae et al., in U.S. Pat. No. 4,465,849, disclose a method for preparing silicone emulsions from organochlorosilanes by slowly adding the latter to an aqueous medium containing a surface active agent. Although the method taught by Terae et al. represents an advancement in the art, the organochlorosilanes used therein present several drawbacks which limit their utility in antifoam applications. First, the organochlorosilanes are generally soluble in most silicone or organic liquid phases and therefore could not be emulsified therein, as they are in water in the method of Terae et al. Second, the silicon-bonded chlorine on the organochlorosilanes is a highly reactive moiety which would react with fillers and various organic or silicone continuous phases of antifoam emulsions and thus would limit general applicability of these systems. Moreover, fillers such as silica could not be easily suspended in the organochlorosilanes due to their low viscosity. Third, since particle size and particle size distribution is often critical to the performance of a given antifoam emulsion system, the method disclosed by Terae et al. is at distinct disadvantage because it offers little control over these parameters.

SUMMARY OF THE INVENTION

It has now been discovered that highly effective silicone antifoam agents and defoaming agents can be obtained by the in-situ gelation of a curable liquid organopolysiloxane which is dispersed in a continuous liquid phase. Unlike many of the silicone antifoam compositions of the prior art, the compositions of the present invention do not have to contain silica in order to exhibit excellent defoaming character. This allows for the formulation of antifoams having low viscosities relative to systems based on mixtures of viscous fluids and silica, thus minimizing the handling and processing difficulties associated with such thick materials. Furthermore, the disadvantages of the above cited method of Terae et al. are overcome and the size of the dispersed particles can be readily controlled through a judicious selection of proper surfactants. Additionally, the density of the dispersed particles can be easily adjusted to provide very stable, non-settling emulsions by the inclusion of inorganic fillers to the dispersed phase component. Such techniques, as well as the addition of non-reactive organopolysiloxanes and the selection of proper processing conditions, allow those skilled in the art to expressly tailor the antifoam composition to a particular application. Still further, unlike the above cited disclosures of Keil, wherein an object was merely to allow the dispersion of a silicone antifoam composition in an incompatible diluent, the method of the present invention actually improves the effectiveness of the antifoam compositions. Likewise, improved foam control results when the compositions of the above cited Starch disclosure are gelled in-situ according to the instant method and added to aqueous heavy duty liquid detergent systems.

The present invention therefore relates to a method for defoaming a foaming system comprising adding to said foaming system an emulsion gelled silicone antifoam prepared by (I) uniformly dispersing
(A) a curable liquid organopolysiloxane composition in
(B) a liquid continuous phase, using
(C) a sufficient quantity of at least one surfactant to form a stable emulsion of said liquid organopolysiloxane (A) in said liquid continuous phase (B); and
(II) curing said dispersed liquid organopolysiloxane (A) within said emulsion to a gelled state.

This invention further relates to an emulsion gelled silicone composition which is preferably employed in the above described method to control foaming in an aqueous detergent system. The curable liquid organopolysiloxane of this antifoam composition preferably comprises either the silicone defoamer composition of Aizawa et al., cited supra, or a combination of a diorganopolysiloxane which contains either Si-bonded hydroxyl or Si-bonded alkoxy functionality and a resinous silicon compound, the liquid continuous phase of the antifoam composition being selected from polypropylene glycol, polyethylene glycol or copolymers of propylene glycol and ethylene glycol.

DETAILED DESCRIPTION OF THE INVENTION

In order to practice the method of the present invention, a curable liquid organopolysiloxane composition (A) is first thoroughly dispersed in a continuous liquid phase (B) with the aid of at least one surfactant (C) to form an emulsion. The liquid organopolysiloxane composition is then cured in-situ (i.e., within the emulsion) to form an emulsion gelled antifoam composition.

The curable liquid organopolysiloxane (A) of the present invention comprises an oligomeric silicone compound or composition containing reactive functional groups, by virtue of which it can be cured to a gel state. The term "gel state" as used herein describes an elastomeric material which is crosslinked so as to exhibit a dynamic mechanical loss tangent (tan $\delta$) of about $\leq 2.0$ when measured at a frequency of 10 Hertz and 25° C. and wherein the peak strain amplitude is $<2\%$. Preferably, the gel also has a dynamic elastic modulus (G') of at least about 1,000 Pascals under these measurement conditions. Gel State, as further defined herein, denotes a crosslinked mass having an insoluble gel fraction of at least 10 weight percent when measured in a good solvent for the liquid organopolysiloxane. Before component (A) is cured, it must have a loss tangent of more than about 2.0 and a gel fraction of less than about 10% under the aforementioned conditions. Preferably, the elastic modulus and gel fraction in the uncured state is essentially zero, as is generally expected for a true liquid. Since fillers (e.g., silica) normally employed in silicone antifoam compositions are insoluble and can impart a significant elastic modulus when dispersed therein, the above mentioned loss tangent and gel fractions are determined on unfilled, neat component (A) for the purposes of the present invention. Alternatively, the gel fraction can be obtained on the filled component (A) if the filler content is subtracted from this measurement. In order to be within the scope of the present invention, the (unfilled) liquid organopolysiloxane (A) must cure to a gelled state, having the above described rheological and solubility properties, within about 12 hours at a temperature of about $\leq 150°$ C. Since it is difficult to carry out measurements on the gelled dispersed particles, the loss tangent and gel fraction determined for the neat component (A) will serve as an indication of when one is operating within the scope of the present invention.

The above rheological characterization can be accomplished by standard methods known in the art. For example, the neat liquid organopolysiloxane (A), containing the proper amount of a cure catalyst, can be placed on the plates of a dynamic mechanical spectrometer and cured therebetween at the above mentioned conditions. Measurement of dynamic mechanical properties at 10 Hz can be carried out while cure is taking place at elevated temperature and thereafter at 25° C. Similarly, the gelled silicone can be extracted by conventional techniques using a good solvent for the liquid organopolysiloxane to a point where no more material is dissolved, the gel fraction then being determined from the amount of the dried insoluble residue.

In its most general form, the oligomeric component (A) is a curable liquid organopolysiloxane or curable liquid organopolysiloxane composition, the term "organopolysiloxane (A)" being used hereinbelow to represent both of these possibilities. Thus, for example, component (A) may be selected from any of the filled or unfilled liquid organopolysiloxane room temperature vulcanizing (RTV) systems known in the art which fit within the rheological and solubility restrictions outlined above. One-part RTVs, wherein cure is accomplished by virtue of reactive groups being attached to organopolysiloxane chains, as well as two-part systems, wherein cure results from the reaction of a low molecular weight crosslinker with reactive groups on the organopolysiloxane, can be used. The scientific and patent literature is replete with examples of these conventional systems and, since these compositions are well known in the art and are available commercially, detailed description thereof is considered unnecessary. By way of illustration, an extensive bibliography of moisture-curable systems is provided in U.S. Pat. No. 3,635,887. Likewise, chapter 8 of W. Noll's text *Chemistry and Technology of Silicones*, Academic Press, New York (1968) offers further description of two-part RTV systems. For the purposes of the present invention, however, none of the components employed can contain silicon-bonded halogen groups. Such groups tend to react with many of the liquid continuous phases of the present invention, the latter being further described infra.

Cure of these systems can be attained through a variety of mechanisms. Ways to facilitate the cure of the above compositions are well known by those skilled in the art, examples being the addition of an appropriate catalyst, application of heat or irradiation with ultraviolet light or other forms of high energy radiation, depending on the particular functionalities present. Whether a given cure mechanism is suitable will, of course, also depend upon the nature of the liquid continuous phase (B), described infra, and the type of surfactants and other ingredients present in the antifoam emulsion. Since cure of the liquid organopolysiloxane (A) must also take place in-situ in the present method (i.e., within the dispersed particles of (A) when it is emulsified in the continuous phase), the antifoam emulsion may not contain any species which would detract from the cure reaction. For example, if ultraviolet light is to be used to promote the gelation of a given liquid organopolysiloxane (A), as taught by Ziemelis in U.S. Pat. No. 4,370,160, the continuous phase (B) would, of necessity, have to be transparent to this form of radiation. Likewise, if a catalyst is added to the antifoam emulsion to facilitate gelation of the liquid organopolysiloxane dispersed therein, it should be slightly soluble in the liquid continuous phase or be surface active with respect to the interface formed between the dispersed organopolysiloxane particles and the continuous liquid phase. The latter condition is preferred since it leads to an efficient concentration of catalyst at the interface to promote the cure reaction. It is also critical for the operation of the present method that such a catalyst is not adversely affected by any component used. For example, in the platinum catalyszed reaction of a liquid organopolysiloxane RTV system wherein cure takes place by a hydrosilation mechanism, the use of any ingredients having, e.g., amine functionality would be prohibited since its inclusion is known to "poison" platinum catalysts. Those skilled in the art will readily recognize the systems wherein the required components are mutually compatible to carry out the method of the present invention.

Component (A) preferably comprises a functional diorganopolysiloxane and a resinous silicon compound, this combination optionally containing a filler such as silica. In these systems, the diorganopolysiloxane has silicone-bonded hydroxyl groups or silicon-bonded alkoxy groups along its main chain or at its chain ends, said alkoxy groups having from 1 to 6 carbon atoms. The resinous silicon compound, which is described in greater detail below, acts as a crosslinker for the diorganopolysiloxane by reacting with the functionality of the latter, as described above. It is further preferred that the above diorganopolysiloxane is either a linear or a branched polymer or copolymer of siloxane units selected from dimethylsiloxane units, methylphenylsiloxane units or methyltrifluoropropylsiloxane units. Most preferably, the diorganopolysiloxane of component (A) is a polydimethylsiloxane containing Si-bonded hydroxyl or methoxy functionality. The above mentioned resinous silicon compound is preferably a siloxane resin consisting essentially of $(CH_3)_3SiO_{\frac{1}{2}}$ and $SiO_2$ units and having a molar ratio of $(CH_3)_3SiO_{\frac{1}{2}}/SiO_2$ between 0.4:1 and 1.2:1. The latter resin may be prepared according to methods taught in, e.g., U.S. Pat. No. 2,676,182 to Daudt et al. and typically contains from about 0.5 to about 3 weight percent of hydroxyl groups.

A highly preferred component (A) is a homogeneous blend of a hydroxyl-terminated polydimethylsiloxane having a viscosity in the range of about 1,000 to 50,000 cS at 25° C. and a siloxane resin having a molar ratio of $(CH_3)_3SiO_{\frac{1}{2}}/SiO_2$ units of about 0.75:1.

Another preferred embodiment of the curable liquid organopolysiloxane, designated herein as component (A'), is the defoamer composition described in U.S. Pat. Nos. 4,639,489 and 4,749,740 to Aizawa et al., cited supra. This embodiment of component (A) is a silicone defoamer reaction product of (i) a polyorganosiloxane; (ii) a resinous silicon compound; (iii) a finely divided filler; and (iv) a catalytic amount of a compound for promoting the reaction of the other components, and is described in detail as follows. For the purposes of the present invention, however, filler (iii) may be entirely omitted from the above reaction product, although it is preferably included therein.

Polyorganosiloxane (i) may be selected from (a) polyorganosiloxanes expressed by the general formula $R^1_a SiO_{(4-a)/2}$ and having a viscosity of 20 to 100,000 centistokes (cS) at 25° C. The organo groups $R^1$ of the polyorganosiloxane (a) are the same or different monovalent hydrocarbon or halogenated hydrocarbon groups having one to ten carbon atoms. Specific examples thereof are well known in the silicone industry and include methyl, ethyl, propyl, butyl, octyl, trifluoropropyl, phenyl, 2-phenylethyl and vinyl groups. The methyl group is particularly preferred. In the above formula, a has a value of 1.9 to 2.2. It is particularly preferred that polyorganosiloxane (a) is a trimethylsiloxy-terminated polydimethylsiloxane having a viscosity of about 350 to 15,000 cS at 25° C.

Alternatively, ingredient (i) of component (A') may be selected from (b) polyorganosiloxanes expressed by the general formula $R^2_b(R^3O)_c SiO_{(4-b-c)/2}$ and having a viscosity of 200 to 100 million centistokes at 25° C. wherein $R^2$ is independently selected from the monovalent hydrocarbon or halogenated hydrocarbon groups designated for group $R^1$, $R^3$ is a hydrogen atom or $R^2$, and the $-OR^3$ group is present at least at the end of a molecular chain of polyorganosiloxane. The value of b is between 1.9 to 2.2 and c has a value so as to provide at least one $-OR^3$ group per molecule. It is particularly preferred that polyorganosiloxane (b) is a hydroxyl-terminated polydimethylsiloxane having a viscosity of about 1,000 to 50,000 cS at 25° C. Ingredient (i) may also be a mixture of (a) and (b) in any proportion.

Ingredient (ii) of component (A') is at least one resinous silicon compound selected from (a') to (c'):

(a') A partially hydrolyzed condensate of an organosilicon compound of the general formula $R^4_d SiX_{4-d}$ wherein $R^4$ is a monovalent hydrocarbon group having one to five carbon atoms, X is hydroxyl or a hydrolyzable group, such as $-OR^5$ or $-OR^6 OR^7$, in which $R^6$ is a divalent hydrocarbon group having one to five carbon atoms and $R^5$ and $R^7$ are each a monovalent hydrocarbon group having one to five carbon atoms. The average value of d does not exceed 1.

(b') A siloxane resin consisting essentially of $(CH_3)_3SiO_{\frac{1}{2}}$ and $SiO_2$ units and having a $(CH_3)_3SiO_{\frac{1}{2}}/SiO_2$ ratio of 0.4/1 to 1.2/1, as recited supra.

(c') A condensate of the siloxane resin (b') with (a').

It is preferred that ingredient (ii) is selected from either an alkyl polysilicate wherein the alkyl group has one to five carbon atoms, such as methyl polysilicate, ethyl polysilicate and propyl polysilicate, or the siloxane resin (b'). Most preferably, ingredient (ii) is either ethyl polysilicate or a siloxane resin copolymer consisting essentially of $(CH_3)_3SiO_{\frac{1}{2}}$ units and $SiO_2$ units in a molar ratio of approximately 0.75:1.

Optional ingredient (iii) of component (A') is a finely divided filler such as fumed $TiO_2$, $Al_2O_3/SiO_2$, $ZrO_2/SiO_2$ or $SiO_2$. Various grades of silica having a particle size of several millimicrons to several microns and a specific surface area of about 50 to 1000 $m^2/g$ are commercially available and suitable for use as ingredient (iii). Preferably, the filler is selected from silicas having a surface area of about 50 to 300 $m^2/g$.

Ingredient (iv) of component (A') is a compound used as a catalyst for promoting the reaction of ingredients (i) to (ii) or (i) to (iii). It is preferably selected from siloxane equilibration and/or silanol-condensing catalysts such as alkali metal hydroxides or alkali metal silanolates.

For the purposes of the present invention, the above preferred component (A') may optionally contain (c) a polyorganosiloxane expressed by the general formula $R^8_e(R^9O)_f SiO_{(4-e-f)/2}$ and having a viscosity of 5 to 200 cS at 25° C. wherein $R^8$ is a monovalent hydrocarbon or halogenated hydrocarbon group having one to ten carbon atoms and $R^9$ is hydrogen or a monovalent hydrocarbon group having one to ten carbon atoms. The value of e is between 1.9 and 2.2 and f has a value so as to provide two or more $-OR^9$ groups in each molecule. It is particularly preferred that polyorganosiloxane (c) is a hydroxyl-terminated polydimethylsiloxane having a viscosity of about 10 to 50 cS at 25° C.

A mixture of ingredients (i), (ii) and (iv), optionally containing ingredient (iii) and/or polyorganosiloxane (c), is reacted at elevated temperature to produce the silicone defoamer reaction products according to the Aizawa et al. patents, the proportions of the various components being:

Ingredient (i)—100 parts by weight;
Ingredient (ii)—0.5 to 20, preferably 1 to 7, parts by weight;
Ingredient (iii)—0 to 30, preferably 1 to 7, parts by weight;
Ingredient (iv)—A catalytic amount (usually in the range of 0.03 to 1 part by weight;
Polyorganosiloxane (c)—0 to 20, preferably 1 to 10, parts by weight.

The proportions of polyorganosiloxanes (a) and (b) used depends largely on their respective viscosities. It is preferable to use a mixture of (a) and (b) which has a viscosity of 1,000 to 100,000 cS at 25° C. The silicone defoamer reaction product (A') is prepared by first mixing ingredients (i) and (ii) and heating this blend to about 110° to 120° C. and then adding catalyst (iv). When employed, the finely divided filler (iii) is then uniformly mixed in using an appropriate dispersing device, such as a homomixer, colloid mill or triple roll mill. The resulting mixture is heated at a temperature of 50° C. to 300° C., preferably 100° C. to 300° C., and reacted for one to eight hours, although the reaction time varies depending on the temperature. If polyorganosiloxane (c) is to be employed in the composition, it is generally added after the filler (iii).

It is preferable to carry out all mixing and heating operations in an inert gas atmosphere in order to avoid any danger and to remove volatile matter (unreacted matter, by-products, etc.). The mixing order of the components and the heating temperature and time as hereinabove stated are not critical, but can be changed as required. It is further preferred that, after reaction, the catalyst is neutralized to further stabilize the silicone defoamer reaction product (A').

All the curable liquid organopolysiloxane compositions used in the method of the present invention preferably further contain, in admixture, a non-reactive polyorganosiloxane of the type described above as ingredient (i) of component (A'). Preferred polyorganosiloxanes in this regard are selected from the same trimethylsiloxy-terminated polydimethylsiloxanes described for the preferred embodiment of polydimethylsiloxane (a) of ingredient (i). In this case, the preferred viscosity range of (a) is about 10 to 50,000 cS. A particularly preferred viscosity range of this component is 1,000 to 50,000 cS, the above viscosities being measured at 25° C.

The liquid continuous phase (B) of the present invention may be a non-reactive silicone, a non-reactive organic composition or water. The term "non-reactive" is intended to convey the restriction that this component be generally compatible with the reactive liquid organopolysiloxane (A), as detailed above. It is contemplated, however, that when component (B) is water, the curable liquid organopolysiloxane (A) may contain hydrolyzable groups (e.g., alkoxy, acetoxy or oximo groups) which react therewith to form silanol groups which can then be condensed to gel the dispersed silicone liquid particles in-situ. Since component (B) is designed to be a distinct phase, its character is further restricted to liquids which are essentially immiscible with the particular liquid organopolysiloxane (A). Thus, for example, if component (A) is to be based on a curable polydimethylsiloxane system, component (B) should not be a polydimethylsiloxane oil; rather, it could be an immiscible polymethyltrifluoropropylsiloxane oil, inter alia. Preferably, component (B) has a viscosity below about 10,000 cS at 25° C. and is selected from polymers of alkylene oxide or copolymers of polydimethylsiloxane and polyoxyalkylene blocks. Examples of component (B) include, among others, polyethylene glycol polypropylene glycol, copolymers of the previous two materials and various silicone-glycol copolymers well known in the art and illustrated, e.g., in the above cited patent application to McGee et al.

In the method of the present invention, the curable liquid organopolysiloxane (A) is first dispersed in the liquid continuous phase (B) with the aid of surfactant(s) (C). Preferred emulsifying and dispersing ingredients to be used as component (C) for the purposes of the present invention are surfactants of the nonionic or anionic type described in U.S. Pat. No. 4,983,316 to Starch, the disclosure of which is hereby incorporated by reference. The skilled artisan will select surfactants which are appropriate (i.e., to give a stable emulsion having the desired particle size distribution) for the particular combination of curable liquid organopolysiloxane (A) and liquid continuous phase (B) under consideration based on routine experimentation.

In highly preferred embodiments of the method of the present invention, 100 parts by weight of one of the above described preferred curable liquid organopolysiloxanes, preferably further containing from about 30 to 100 parts by weight of the above described trimethylsiloxy-terminated polydimethylsiloxane having a viscosity of about 10 to 50,000 cS at 25° C., is dispersed in about 70 to 150 parts by weight of a liquid continuous phase selected from polypropylene glycol, polyethylene glycol or copolymers of propylene glycol and ethylene glycol, using a sufficient quantity of at least one nonionic surfactant to form a stable emulsion of the liquid organopolysiloxane in the liquid continuous phase.

Surfactants particularly suitable here include the block copolymers of polydimethylsiloxane with polyalkylene oxide copolymers or a trimethylsilyl endcapped polysilicate which has been condensed with a polyalkylene glycol. These surfactants are well known in the art and are exemplified by the "dispersing agents" disclosed by Keil in U.S. Pat. Nos. 3,784,479 and 3,984,347, the disclosures of which are hereby incorporated by reference to teach said surfactants. Typically, from about 10 to 40 parts by weight of surfactant is used for each 100 parts by weight of component (A).

In the method of the present invention, after the surfactant or surfactant mixture is thoroughly blended with component (B), dispersion of premixed component (A) in this combination can be carried out by simply mixing these components using any suitable equipment (e.g., stirrer or mill) to form an emulsion. After the emulsion of component (A) in continuous phase (B) is prepared, the liquid organopolysiloxane is cured by the appropriate mechanism, as described above. In the highly preferred embodiments of the present invention, a condensation catalyst, such as stannous octoate, dibutyltin dilaurate or tetrabutyl titanate, is mixed into the emulsion to facilitate the in-situ cure of the preferred component (A) at ambient or elevated temperature. As described above, the time and temperature needed to complete the cure in-situ is taken to be substantially the same as that required to cure the neat liquid organopolysiloxane (A) to the aforementioned gel state. The catalyst concentration is thus adjusted to comply with the previously stated requirements of loss tangent and gel fraction. The skilled worker can readily verify that the in-situ cure of the liquid organopolysiloxane (A) has indeed taken place by microscopic observation. Thus, whereas the particles of the uncured emulsion appear to be spherical under an appropriate magnification, the cured particles show a generally irregular shape. These cured particles, furthermore, retain their irregularity and exhibit surface wrinkling when compressed between microscope slides, while their uncured counterparts again appear round and show no wrinkling when so examined. Such observation would confirm that the liquid organopolysiloxane, liquid continuous phase and mode of cure are in fact compatible and no inhibition of cure has occurred, as required in the instant method.

In addition to the above mentioned components, the foam control agents of the present invention may also contain adjuvants such as filler, corrosion inhibitors, dyes, and the like. The method of the present invention finds utility in preventing foam in aqueous and non-aqueous foaming systems (antifoam) as well as in reducing existing foaming in such systems (defoamer). The present method is particularly suitable for controlling foam in aqueous foaming detergent systems, such as those described in U.S. Pat. No. 4,983,316, cited supra. In such systems, the above-described preferred emulsion gelled silicone antifoams may simply be added to a foaming aqueous detergent system as practiced in U.S. Pat. No. 4,983,316. Typically, the gelled antifoam emulsion of the present invention is added at a concentration of about 0.01 to 0.1 percent based on the weight of the detergent, however the skilled artisan will readily determine optimum concentrations after a few routine experiments. The method of addition is not critical, and the gelled antifoam emulsion may be metered in or added by any of the techniques known in the art.

EXAMPLES

The following examples are presented to further illustrate the method and compositions of this invention, but are not to be construed as limiting the invention, which is delineated in the appended claims. All parts and percentages in the examples are on a weight basis and all measurements were made at 25° C. unless indicated to the contrary.

The following materials, listed alphabetically for ease of reference, were employed in the preparation of the antifoam compositions:

FLUID A = A hydroxyl-terminated polydimethylsiloxane having a viscosity of 13,500 cS.

FLUID B = A trimethylsiloxy-terminated polydimethylsiloxane having a viscosity of 12,500 cS.

FLUID C = A trimethylsiloxy-terminated polydimethylsiloxane having a viscosity of 1,000 cS.

PLURONIC TM L101 = A block copolymer of ethylene oxide and propylene oxide marketed by BASF, Parsippany, NJ.

POLYGLYCOL TM P4000 = A polypropylene glycol having a molecular weight of about 4,000 (Dow Chemical Co., Midland, Mich.).

RESIN 1 = A 70% xylene solution of a hydroxyl-functional siloxane resin copolymer consisting essentially of $(CH_3)_3SiO_{\frac{1}{2}}$ units and $SiO_2$ units in a molar ratio of approximately 0.75:1.

SIPERNAT TM D10 is described as a hydrophobic silica and marketed by Degussa Corp. (Ridgefield Park, N.J.).

SURFACTANT 1 = A silicone glycol copolymer prepared according to methods described by Keil in U.S. Pat. No. 3,784,479. A mixture of 12 parts of RESIN 1 (supra), 22 parts of VORANOL TM CP3810 (a copolymer of ethylene oxide and propylene oxide having a molecular weight of 3,500 to 4,000 and marketed by Dow Chemical Co., Midland, MI), was reacted at 135°-140° C. for 4 hours using 0.17 part of a stannous octoate catalyst. The catalyst in this reaction product was neutralized by the addition of about 0.1 part of phosphoric acid and the product was stripped, cooled and then blended with 31 parts of polypropylene glycol having a molecular weight of about 2,000, whereupon remaining volatiles were flashed off at 40 mm Hg at 140° C.

SURFACTANT 2 = A silicone glycol copolymer prepared according to methods described by Keil in U.S. Pat. No. 3,784,479. A mixture of 7 parts of RESIN 1 (supra), 15 parts of UCON TM 50HB/5100 (a copolymer of ethylene oxide and propylene oxide marketed by Union Carbide (Danbury, CN) and 38 parts of xylene was reacted at reflux for 8 hours using 0.2 part of a stannous octoate catalyst. The catalyst in this reaction product was neutralized by the addition of about 0.1 part of phosphoric acid and the product was blended with 40 parts of POLYGLYCOL TM P15-

200 (an ethylene oxide/propylene oxide triol polymer having a molecular weight of about 2,600 and marketed by Dow Chemical Co.). The product was stripped and filtered.

TRITON TM X-100=A octylphenoxypolyethoxy(1-0)ethanol having an HLB value of 13.5 marketed by Rohm and Haas, Philadelphia, PA.

EXAMPLE 1

A liquid silicone defoamer reaction product was prepared according to Example 1 of U.S. Pat. No. 4,639,489 to Aizawa et al., cited supra. This antifoam contained 60 parts of FLUID C; 29 parts of FLUID A; 2.9 parts of ethyl polysilicate ("Silicate 45" of Tama Kagaku Kogyo Co., Ltd., Japan); 4.8 parts of a potassium silanolate catalyst; 2.9 parts of Aerogel #200 silica (Nippon Aerogel Co., Japan) having a surface area of 200 $m^2/g$; and 4.8 parts of hydroxyl-terminated polydimethylsiloxane having a viscosity of 40 cS. In addition to the above ingredients, this formulation also included 0.3 parts of ethanol as part of the catalyst, 0.1 part water adsorbed on the silica and 0.1 part of L-540, added as a process dispersant. L-540 (Union Carbide Corp., Danbury, Conn.) is described as a silicone glycol block copolymer wherein the glycol blocks consist of 50/50 mole percent of polyoxyethylene/polyoxypropylene. After the reaction was complete, the silanolate catalyst was neutralized by the addition of carbon dioxide in the form of dry ice.

EXAMPLE 2

An antifoam emulsion was prepared according to the disclosure of above cited U.S. Pat. No. 4,983,316 to Starch, by thoroughly dispersing a mixture of 8.3 parts of FLUID B, 2.5 parts of SURFACTANT 1 and 1.25 of SURFACTANT 2 in 45 parts of POLYGLYCOL TM P4000 using a CHEMINEER TM stirrer (i.e., a motor-driven propeller) set at a high speed. To this dispersion, there was then added 8.3 parts of PLURONIC TM L101 and 1.25 parts of TRITON TM X-100, these two ingredients being also mixed in at high speed. Finally, 33.3 parts of the liquid silicone defoamer reaction product prepared in Example 1 was dispersed in the above system using a relatively low stirrer speed.

EXAMPLE 3

Another liquid silicone defoamer reaction product, one which contained no silica, was prepared by heating a mixture of 64.3 parts of FLUID C, 32.1 parts of FLUID A and 3.41 parts of RESIN 1 to 180° C. at 4 mm Hg. After one hour under these conditions, the mixture was cooled to 80° C. and 0.142 part of a potassium propoxide catalyst solution (5% KOH in isopropyl alcohol) was and the temperature maintained for about 5 hours. At this point, the catalyst was neutralized with 0.008 part of acetic acid. This product is referred to as Example 3a in the following.

A simple blend, consisting of 95 parts of the above Example 3a and 5 parts of SIPERNAT TM D10 silica, was prepared and will be referred to as Example 3b in the following.

EXAMPLE 4

A silica-free antifoam emulsion was prepared as in Example 2, wherein the liquid silicone defoamer reaction product of Example 1 was replaced with the silicone defoamer reaction product of Example 3a. This emulsion is referred to as Example 4a in the following evaluations.

Another, silica-containing, antifoam emulsion was prepared according to the method of Example 2, wherein the liquid silicone defoamer reaction product of Example 1 was replaced with the silicone defoamer reaction product of Example 3b. This emulsion is referred to as Example 4b in the following evaluations.

EXAMPLE 5

About 0.5% stannous octoate catalyst (Nuocure 28, Tenneco Chemicals Co., Atlanta, Ga.) was mixed with the neat liquid silicone defoamer reaction product of Example 1, whereupon the mixture gelled in a matter of minutes to form a soft, sticky elastomer. This elastomer readily recovered its shape when stretched or deformed. Adding stannous octoate to the liquid silicone defoamer reaction product of Example 3a also caused it to gel. Such gelled elastomers could not readily be dispersed in a liquid continuous medium such as polypropylene glycol.

EXAMPLE 6

Cure of the catalyzed neat liquid silicone defoamer reaction product as a function of time was followed using a dynamic rheometer. The composition of Example 1 was catalyzed with 1% of stannous octoate and immediately placed on the plate of the rheometer (Carri-Med Mitech CS; cone/plate having a diameter of 4 cm; frequency=10 Hz; maximum strain <2%). Representative values of the dynamic elastic modulus (G') and the loss tangent (tan δ), shown in the following table, indicated that the composition had a tan δ of less than 2.0 in less than one half hour at 25° C.

| Time (Hours) | G' (Pa) | Tan δ |
|---|---|---|
| 0.5 | 970 | 1.25 |
| 1 | 1100 | 1.16 |
| 4 | 1590 | 0.94 |
| 8 | 2050 | 0.81 |
| 11 | 2290 | 0.75 |
| 14 | 2550 | 0.70 |

A similar procedure using the uncatalyzed neat liquid silicone defoamer reaction product of Example 1 showed that no gellation occurred (steady state values of 208 Pa for G' and 2.8 for tan δ).

EXAMPLE 7

A procedure similar to that described in Example 6 was followed wherein the unfilled liquid silicone defoamer reaction product of Example 3a was catalyzed with 0.25% of stannous octoate and tested as a function of time at 75° C. Again, representative values of (G') and tan δ are shown in the following table.

| Time (Hours) | G' (Pa) | Tan δ |
|---|---|---|
| 0.5 | 414 | 1.70 |
| 1.0 | 508 | 1.51 |
| 2.0 | 613 | 1.35 |
| 4.0 | 667 | 1.29 |

After about 4.5 hours at 75° C., the catalyzed composition was cooled to 25° C. within the rheometer and the values of G' and tan δ were than about 1,070 Pa and 1.22, respectively. In a separate experiment, the liquid silicone defoamer reaction product of Example 3a was catalyzed with 0.27% of stannous octoate and cured for 12 hours at 100° C. The resulting gelled material was extracted with refluxing toluene and was shown to have a gel fraction of about 47%.

The corresponding uncatalyzed liquid silicone defoamer reaction product of Example 3a was also tested as above and had a tan δ of 2.1 at 25° C.

The above antifoam systems were evaluated with respect to their foam control performance using aqueous foaming systems based on a commercial powdered laundry detergent and a typical high-anionic heavy duty liquid detergent.

Pump Test

An automated pump tester consisted of a 15 gallon cylindrical plastic vessel, which held a quantity of simulated wash liquor or laundry detergent in water, and two pumps, which circulated the wash liquor. Plastic hoses were arranged so that the wash liquor was drawn from the vessel by the first pump and passed through a valve where a controlled amount of air was introduced into the liquid. A second pump mixed the air and wash liquor and returned the mixture to the vessel. When the pumps were started, a column of foam collected on the surface of the liquid in the vessel. The height of this foam column was detected by an ultrasonic ranging device which was connected to a computer so that foam height measurements could be recorded at regular time intervals.

The wash liquor was prepared by dispersing a measured amount of a heavy duty liquid laundry detergent in 8.6 liters of deionized water to which had been added 14.6 grains of a water hardness additive having a calcium:magnesium ratio of 3:1, the purpose of the latter being to simulate water hardness, which is known to have an effect on the foaming properties of laundry detergents. The amount of heavy duty liquid laundry detergent added to the simulated hard water was 17.5 grams. Results of these tests are indicated below.

The antifoam emulsion of Example 2 was evaluated according to the above described pump test after the antifoam emulsion was aged at room temperature for the time intervals shown in the first column of Table 1. Foam height, as a percent of a control containing no antifoam, is reported in the second column of this table. Additionally, this antifoam emulsion was further mixed with 0.25% (based on the emulsion weight) of stannous octoate and tested in a similar manner. Table 1 shows the respective foam height results for these systems wherein the antifoam was used as prepared (column 3) and wherein the emulsion/catalyst combination was stirred for about 12 hours before being aged and subsequently subjected to the pump test (column 4).

TABLE 1

Pump test results for the antifoam emulsion of Example 2. Foam height is given as a percent of control containing no antifoam. Antifoam emulsion level = 0.1% based on the liquid detergent.

| Age Time | No Catalyst | Catalyst Added | Catalyst Added and Stirred 12 Hours |
|---|---|---|---|
| 18 hours | — | 71% | 78% |
| 48 hours | — | 64 | 65 |
| 5 days | 89% | 77 | 57 |
| 12 days | 80 | 87 | 57 |
| 3 months | 69 | 91 | 64 |

It can be seen that the efficacy (i.e., foam reduction) of the antifoam emulsion was significantly improved by gelling the silicone component in-situ by the addition of catalyst and without the need to age the emulsion. Gelation of the dispersed silicone particles in the catalyzed antifoam emulsion was evidenced by the following two observations: (1) microscopic examination showed irregularly-shaped, wrinkled particles; and, as indicated above, (2) addition of stannous octoate to the neat liquid silicone defoamer reaction product of Example 1 caused essentially immediate gellation thereof. Microscopic observation further revealed that the deterioration in performance of the systems which were not stirred an additional 12 hours was accompanied by considerable irreversible particle agglomeration wherein the gelled particles had stuck together (but not coalesced). Contrarily, much less particle agglomeration was seen in the case of the emulsions which contained catalyst and were additionally stirred for 12 hours.

Washing Machine Test

A conventional top-loading washing machine designed for home use (Whirlpool Imperial Seventy, super capacity, model:LA7800XPW1) was fitted with a special measuring device to allow foam height to be measured at six equally spaced points around its central agitator. This was done to compensate for the fact that the foam does not rise to a uniform height across the surface of the wash liquor. For every measurement, the six foam height readings were averaged to provide a more reproducible value for foam height inside the machine.

Ten bath towels (100% cotton) were used as a ballast in each test (total weight of about 3.3 kg). For each test washing load, 100±2 grams of CHEER ™ powdered detergent (phosphate-free) manufactured by the Proctor & Gamble Company (Cincinnati, Ohio) was used. In these evaluations, the amount of antifoam used in each run is reported herein in parts per million (ppm) based on the weight of the detergent (e.g., 125 ppm of antifoam corresponds to 0.0125 gm of antifoam in 100 gm of detergent). In order to accurately weigh such small amounts of antifoam, the antifoams were first diluted with an inert (i.e., non-foam-suppressing) diluent, POLYGLYCOL ™ 425 (Dow Chemical Co.).

The following washing machine settings were used:
temperature: warm/cold (wash/rinse) (actual wash temperatures were in the range of 31°–38° C.)
load size: large
type wash: regular
wash time: 14 minutes The towels were first placed in the machine and the wash cycle was started. In most cases, the towels were dry, but it was found that wet towels (from a previous test cycle) gave the same results. After the washer was filled, and the agitator started, the machine was allowed to run for 2 minutes to thoroughly wet the towels and submerge them in the water. The machine was then stopped and the water level determined. The CHEER ™ was weighed into a suitable container, such as a glass beaker, and the antifoam/diluent mixture was weighed directly onto the detergent powder. The washer was then reset (to the 14 minute cycle), the CHEER ™/antifoam combination added and the lid closed to restart the machine. Foam height readings were taken after 7 minutes and averaged, as discussed above. After the completion of the wash cycle, the machine was allowed to complete the rest of its program (spin, rinse, spin). The towels were then either dried in a home clothes dryer, or used in subsequent tests without drying.

For each antifoam evaluation, the results of two or three separate runs were averaged to provide a more reliable value for the performance of a particular antifoam.

Evaluation of catalyzed (0.25% stannous octoate) and uncatalyzed antifoam emulsion of Example 4b in the washing machine test resulted in similar behavior and is summarized in Table 2.

TABLE 2

Washing machine test on antifoam emulsion of Example 4b. Average foam height in centimeters after 7 minutes. Antifoam level = 125 ppm.

| Age Time | Uncatalyzed | Catalyst and Stirred 12 Hours |
|---|---|---|
| 2 weeks | 4.2 cm | 3.3 cm |
| 8 weeks | 3.8 | 1.5 |

Table 2 shows that addition of catalyst (again, 0.25% based on the weight of the antifoam emulsion) to the liquid silicone defoamer reaction product of Example 3b also caused improved performance, particularly after 8 weeks. Under these conditions, a CHEER TM control having no foam control agent added gave a foam height of 9.2 cm.

The above washing machine test was repeated using catalyzed and uncatalyzed antifoam emulsions of Examples 2 and Example 4a, wherein the antifoam level was increased to 1,250 ppm based on the CHEER TM detergent. These results are presented in Table 3, wherein the catalyzed systems were stirred an additional 12 hours before testing, as described above.

TABLE 3

Washing machine tests on the antifoam emulsions of Example 2 and Example 4a. Average foam height in centimeters after 7 minutes. Antifoam level = 1,250 ppm.

| | Emulsion of Example 2 | | Emulsion of Example 4a | |
|---|---|---|---|---|
| Age Time | No Catalyst | Catalyst | No Catalyst | Catalyst |
| 1 week | 3.91 cm | 0 cm | 3.5 cm | 3.06 cm |
| 8 weeks | 0 | 0 | 3.22 | 0 |

The above washing machine tests were repeated using a range of antifoam emulsion concentrations wherein the emulsions were based on Example 4b, either uncatalyzed or catalyzed with 0.25% stannous octoate and stirred for an additional 12 hours. The results, after aging for 2 and 8 weeks, are reported in Table 4.

TABLE 4

Washing machine tests on the antifoam emulsion of Example 4b. Average foam height in centimeters after 7 minutes.

| Antifoam Emulsion Conc. (ppm) | No Catalyst (2 Weeks) | Catalyst (2 Weeks) | No Catalyst (8 Weeks) | Catalyst (8 Weeks) |
|---|---|---|---|---|
| 1250 | 0.2 | 0 | — | — |
| 250 | 2.03 | 1.06 | — | — |
| 125 | 4.19 | 3.33 | 3.8 | 1.5 |

These results show that the improvement in performance occurs over a wide concentration range of the antifoam emulsion. However, 1250 ppm is such a high level that, in this test, both the catalyzed and uncatalyzed versions reduced foam to an essentially undetectable level.

That which is claimed is:

1. A method for defoaming an aqueous foaming system comprising: adding to said aqueous foaming system an emulsion gelled dispersed particles of silicone antifoam composition prepared by (I) uniformly dispersing
    (A) a curable liquid organopolysiloxane composition comprising a blend of a diorganopolysiloxane having silicon-bonded functionality selected from the group consisting of a hydroxyl group and alkoxy groups having 1 to 6 carbon atoms and a resinous silicon compound selected from the group consisting of
        (a') a partially hydrolyzed condensate of an organosilicon compound of the general formula $R^4_d SiX_{4-d}$ in which $R^4$ is a monovalent hydrocarbon group having 1 to 5 carbon atoms, X is selected from the group consisting of hydroxyl and a hydrolyzable group and d has an average value of one or less,
        (b') a siloxane resin consisting essentially of $(CH_3)_3SiO_{\frac{1}{2}}$ units and $SiO_{4/2}$ units wherein the ratio of $(CH_3)_3SiO_{\frac{1}{2}}$ units to $SiO_{4/2}$ units is 0.4:1 to 1.2:1, and
        (c') a condensate of said siloxane resin (b') with (a'),
    in
    (B) a liquid continuous phase selected from the group consisting of polypropylene glycol, polyethylene glycol and copolymers of propylene glycol and ethylene glycol, using
    (C) a sufficient quantity of at least one nonionic surfactant to form a stable emulsion of said liquid organopolysiloxane (A) in said liquid continuous phase (B) and (II) curing said dispersed liquid organopolysiloxane composition (A) within said emulsion to obtain an emulsion of gelled dispersed particles of silicone antifoam.

2. The method according to claim 1, wherein said diorganopolysiloxane of component (A) is selected from the group consisting of polymers of dimethylsiloxane units, methylphenylsiloxane units and methyltrifluoropropylsiloxane units, said polymers having Si-bonded functionality selected from the group consisting of a hydroxyl group and a methoxy group.

3. The method according to claim 2, wherein said resinous silicon compound of component (A) is selected from the group consisting of alkyl polysilicates in which the alkyl group has 1 to 5 carbon atoms and said siloxane resin (b') and said diorganopolysiloxane of component (A) is polydimethylsiloxane.

4. The method according to claim 3, wherein said organopolysiloxane composition (A) further comprises a trimethylsiloxy-terminated polydimethylsiloxane having a viscosity of 10 to 50,000 cS at 25° C.

5. The method according to claim 4, wherein said resinous silicon compound is selected from the group consisting of ethyl polysilicate and a siloxane resin copolymer consisting essentially of $(CH_3)_3SiO_{\frac{1}{2}}$ units and $SiO_2$ units in a molar ratio of approximately 0.75:1.

6. A composition prepared by
    (I) uniformly dispersing 100 parts by weight of
        (A) a curable liquid organopolysiloxane composition in 70 to 150 parts by weight of
        (B) a liquid continuous phase selected from the group consisting of polypropylene glycol, polyethylene glycol and copolymers of propylene glycol and ethylene glycol, using
        (C) a sufficient quantity of at least one nonionic surfactant to form a stable emulsion of said liquid organopolysiloxane in said liquid continuous phase; and (II) curing said dispersed liquid organopolysiloxane composition (A) within said emulsion to obtain an emulsion of gelled dispersed particles of silicone antifoam, wherein said curable liquid organopolysiloxane (A) is a silicone defoamer reaction product, prepared at 50° C. to 300° C. in the presence of a catalytic amount of a compound for promoting the reaction, of the following ingredients:

(i) 100 parts by weight of at least one polyorganosiloxane selected from the group consisting of (a) a polyorganosiloxane having a viscosity of about 20 to 100,000 cS at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of 1.9 to 2.2 and (b) a polyorganosiloxane having a viscosity of 200 to about 100 million cS at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of 1.9 to 2.2 and c has a sufficiently large value to give at least one —$OR^3$ group in each molecule, at least one such —$OR^3$ group being present at the end of the molecular chain; and (ii) 0.5 to 20 parts by weight of at least one resinous silicon compound selected from the group consisting of (a') a partially hydrolyzed condensate of an organosilicon compound of the general formula $R^4_d SiX_{4-d}$ in which $R^4$ is a monovalent hydrocarbon group having 1 to 5 carbon atoms, X is selected from the group consisting of hydroxyl and a hydrolyzable group and d has an average value of one or less, (b') a siloxane resin consisting essentially of $(CH_3)_3 SiO_{\frac{1}{2}}$ units and $SiO_{4/2}$ units wherein the ratio of $(CH_3)_3 SiO_{\frac{1}{2}}$ units to $SiO_{4/2}$ units is 0.4:1 to 1.2:1, and (c') a condensate of said siloxane resin (b') with (a').

7. The composition according to claim 6, wherein said silicone reaction product further contains from 0.5 to 30 parts by weight of (iii) a finely divided filler.

8. The composition according to claim 7, wherein said silicone defoamer reaction product additionally contains up to 20 parts by weight of (c) a polyorganosiloxane having a viscosity of 5 to 200 cS at 25° C. and being expressed by the general formula $R^8_e(R^9O)_f SiO_{(4-e-f)/2}$ in which $R^8$ is a monovalent hydrocarbon or halogenated hydrocarbon group having 1 to 10 carbon atoms, $R^9$ is hydrogen or a monovalent hydrocarbon group having 1 to 10 carbon atoms, e is from 1.9 to 2.2 and f has a sufficiently large value to give at least two —$OR^9$ groups in each molecule at the end of a molecular chain.

9. The composition according to claim 8, wherein said polyorganosiloxane (a) is a trimethylsiloxy-terminated polydimethylsiloxane having a viscosity of about 350 to 15,000 cS at 25° C., said polyorganosiloxane (b) is a hydroxyl-terminated polydimethylsiloxane having a viscosity of about 1,000 to 50,000 cS at 25° C. and said polyorganosiloxane (c) is a hydroxyl-terminated polydimethylsiloxane having a viscosity of about 10 to 50 cS at 25° C.

10. The composition according to claim 9, wherein said finely divided filler (iii) is silica.

11. The composition according to claim 9, wherein said organopolysiloxane composition (A) further comprises a trimethylsiloxy-terminated polydimethylsiloxane having a viscosity of 10 to 50,000 cS at 25° C. and said resinous silicon compound (ii) is selected from the group consisting of alkyl polysilicates in which the alkyl group has 1 to 5 carbon atoms and said siloxane resin (b').

12. The composition according to claim 11, wherein said resinous silicon compound (ii) is selected from the group consisting of ethyl polysilicate and a siloxane resin copolymer consisting essentially of $(CH_3)_3 SiO_{\frac{1}{2}}$ units and $SiO_2$ units in a molar ratio of approximately 0.75:1.

13. The composition according to claim 9, wherein said organopolysiloxane composition (A) further comprises a trimethylsiloxy-terminated polydimethylsiloxane having a viscosity of 10 to 50,000 cS at 25° C.

14. The composition according to claim 1, wherein said polyorganosiloxane (a) is a trimethylsiloxy-terminated polydimethylsiloxane having a viscosity of about 350 to 15,000 cS at 25° C. and said polyorganosiloxane (b) is a hydroxyl-terminated polydimethylsiloxane having a viscosity of about 1,000 to 50,000 cS at 25° C.

15. The composition according to claim 14, wherein said silicone defoamer reaction product further contains from 0.5 to 30 parts by weight of (iii) a finely divided filler.

16. The composition according to claim 14, wherein said organopolysiloxane composition (A) further comprises a trimethylsiloxy-terminated polydimethylsiloxane having a viscosity of 10 to 50,000 cS at 25° C.

17. The composition according to claim 16, wherein said resinous silicon compound (ii) is selected from the group consisting of alkyl polysilicates in which the alkyl group has 1 to 5 carbon atoms and said siloxane resin (b').

18. The composition according to claim 17, wherein said resinous silicon compound (ii) is selected from the group consisting of ethyl polysilicate and a siloxane resin copolymer consisting essentially of $(CH_3)_3 SiO_{\frac{1}{2}}$ units and $SiO_2$ units in a molar ratio of approximately 0.75:1.

19. The composition according to claim 16, wherein said silicone reaction product further contains from 0.5 to 30 parts by weight of (iii) a finely divided filler.

20. The composition according to claim 19, wherein said filler is silica.

21. The composition according to claim 20, wherein said resinous silicon compound (ii) is selected from the group consisting of ethyl polysilicate and a siloxane resin copolymer consisting essentially of $(CH_3)_3 SiO_{\frac{1}{2}}$ units and $SiO_2$ units in a molar ratio of approximately 0.75:1, and said liquid continuous phase (B) is polypropylene glycol.

22. The composition according to claim 14, wherein said organopolysiloxane composition (A) further comprises a trimethylsiloxy-terminated polydimethylsiloxane having a viscosity of 10 to 50,000 cS at 25° C. and said liquid continuous phase (B) is polypropylene glycol.

23. A method for defoaming a foaming system comprising adding to said foaming system the composition of claim 6.

24. A method for defoaming a foaming system comprising adding to said foaming system the composition of claim 9.

25. A method for defoaming a foaming system comprising adding to said foaming system the composition of claim 12.

26. A method for defoaming a foaming system comprising adding to said foaming system the composition of claim 13.

27. A method for defoaming a foaming system comprising adding to said foaming system the composition of claim 14.

28. A method for defoaming a foaming system comprising adding to said foaming system the composition of claim 20.

29. A method for defoaming a foaming system comprising adding to said foaming system the composition of claim 22.

30. The method of claim 23, wherein said foaming system is an aqueous detergent composition.

31. The method of claim 24, wherein said foaming system is an aqueous detergent composition.

32. The method of claim 25, wherein said foaming system is an aqueous detergent composition.

33. The method of claim 26, wherein said foaming system is an aqueous detergent composition.

34. The method of claim 27, wherein said foaming system is an aqueous detergent composition.

35. The method of claim 28, wherein said foaming system is an aqueous detergent composition.

36. The method of claim 29, wherein said foaming system is an aqueous detergent composition.

* * * * *